O. H. WENDT.
TOOL MAKER'S LOCATING TOOL.
APPLICATION FILED JULY 12, 1913.
1,101,601.
Patented June 30, 1914.
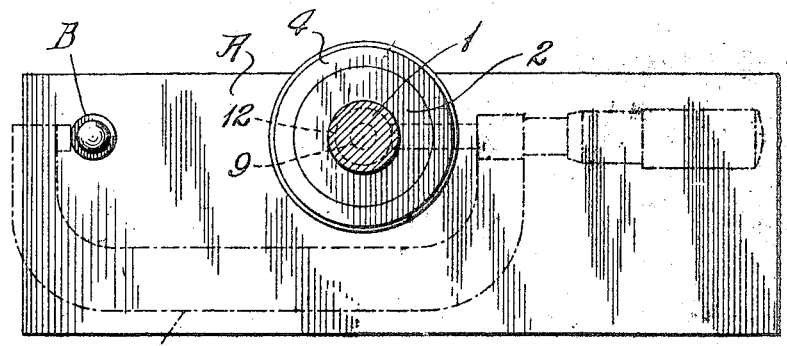
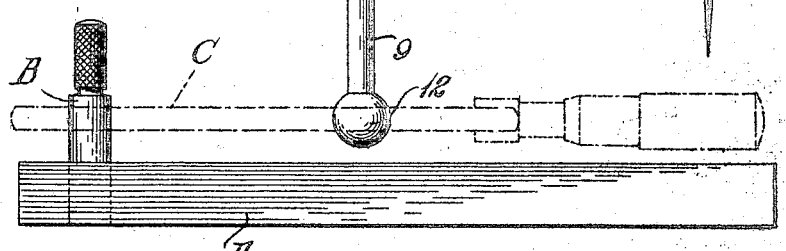
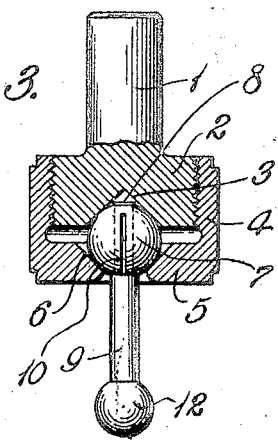
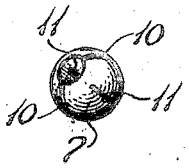
Inventor
Oswald H. Wendt,
Witnesses
Chas. W. Stauffiger
J. A. Noeske

UNITED STATES PATENT OFFICE.

OSWALD H. WENDT, OF DETROIT, MICHIGAN.

TOOL-MAKER'S LOCATING-TOOL.

1,101,601.  Specification of Letters Patent.  Patented June 30, 1914.

Application filed July 12, 1913. Serial No. 778,701.

*To all whom it may concern:*

Be it known that I, OSWALD H. WENDT, a citizen of the United States of America, residing at Detroit, in the county of Wayne and State of Michigan, have invented certain new and useful Improvements in Tool-Makers' Locating-Tools, of which the following is a specification, reference being had therein to the accompanying drawings.

In making jigs and other tools where it is necessary to locate centers very accurately, it has been the usual practice with tool makers to turn up accurately in the chuck to be used for holding the boring tool, a plug for locating the center for boring and then make the usual measurements with the aid of this plug. Each time a center is to be located it is necessary to make such a plug in order that any inaccuracy in the chuck for holding the boring tool may be eliminated and the axial line of rotation of the spindle or other rotating member to which the chuck is attached may be brought to a point which is exactly the desired distance from another point of the work.

The object of this invention is to provide a tool for use in locating centers, which tool may be adjusted to coincide with the axis of rotation of the drill spindle or other driving member to which it is attached and to so construct such a tool as to give the maximum of accuracy.

A further object is to provide a simple and conveniently operated device for the purpose having certain other new and useful features, all as hereinafter more fully described.

To these ends the invention consists in the matters hereinafter set forth and more particularly pointed out in the appended claims, reference being had to the accompanying drawing in which—

Figure 1, illustrates diagrammatically a tool embodying the invention as it is used in practice, the tool being shown in end elevation; Fig. 2 is a similar view showing the tool in side elevation; Fig. 3 is a longitudinal section of the tool detached; Fig. 4 is a perspective view of the gripping head for the tool detached; Fig. 5 is a side elevation of the wabble arm of the tool detached; and Fig. 6 is a side elevation of a wabble point adapted to be used with the tool.

In the drawing, the work is indicated at A as being a flat rectangular piece of metal in which holes are to be bored at specified distances apart, but it will be understood that the device embodying the invention may be used in locating boring or other centers in any kind or form of work, the rectangular block or plate A being shown merely to illustrate the manner in which the tool embodying the invention is used. The first hole to be bored in the work is located as nearly correct as may be and bored in the usual manner. A center or test plug B of the usual form is then placed in this hole so that by means of a suitable measuring instrument such as a micrometer gage C, the desired distance may be measured for locating the second hole in the work. In order that the work may be so placed upon the work table (not shown) of the boring or other machine used in boring the holes with the center of the second hole to be bored exactly in the line of the axis of rotation of the spindle or other rotatable driving member (not shown) of the machine, the tool embodying this invention is placed within a chuck or other holder indicated at D, which chuck is carried by the spindle in the usual manner.

The center locating tool embodying this invention comprises a shank member 1 adapted to be engaged by the chuck for holding the tool, and an enlarged and externally screwthreaded end portion 2 on the shank is formed with a conical recess 3 in its end at the axis thereof. A sleeve 4 is internally screwthreaded to engage the external screw threads of the enlarged end of the shank member and the end of the sleeve is formed with a wall 5 having an axial opening with a conical recess or seat 6 at the inner end of the opening to engage a globular gripping head 7 which also seats in the opposed conical recess 3. The head 7 is formed with an axial bore extending therethrough to receive the reduced end portion 8 of the wabbler arm 9, and the head is also split diametrically inward from one end of its axial bore to a point near the opposite end by a cut 10 and in a like manner is severed transversely inward from the opposite end of its bore by a cut 11 extending at right angles to the cut 10. The head is therefore divided into halves at each end of the bore through which the end of the arm 8 extends and is adapted to yieldingly and frictionally engage the arm when the spring portions of the head are forced into frictional contact with the arm by turning the sleeve 4 upon the head 2 of the shank. The external surface of the sleeve 4 is preferably milled or otherwise formed so that it may be readily turned by the operator to secure the wabbler arm in the position in which it is set in the holder formed by said sleeve. The lower end of the wabbler arm 9 is formed with a spherical enlargement 12 which should be very accurately made in order that all parts of its surface except where it is attached to the end of the arm, will be equidistant from its center.

In order that the line of the axis of rotation of the driving member or spindle may be brought to a point exactly at the desired distance from the center of the hole in which the test plug B is placed, the locating tool is secured in the chuck spindle and the wabbler arm is then adjusted while the tool is rapidly rotated, to bring the center of the spherical end of the arm 12 into co-incidence with the axis of rotation. The operator will then locate the work A by measuring as indicated in Fig. 1, with his micrometer by bringing the jaws thereof which have been properly set, into contact with the outer side of the test plug B and the outer side of the ball 12. In setting the micrometer the jaws will be adjusted to a distance apart exactly equal to one-half the diameters of the test plug and head 12 plus the desired distance between the centers of the holes in the work. He is therefore enabled by means of his micrometer to place his work so that the axis of rotation of the drill spindle will be exactly the desired distance from the axis of the first hole, at which he wished to locate the center of the second hole. After so locating the work in relation to the axis of rotation of the drill spindle, the operator will then remove the locking tool from the chuck and place a drill therein for drilling the hole in the work. As in the usual practice, this drill will make a hole of less diameter than the diameter of the hole which it is desired to form in the work, and after removing the drill, a suitable cutter is placed in the chuck and the hole bored out to the exact diameter desired.

By providing the globular gripping head for holding the wabbler arm, said arm may be adjusted in any direction to bring the center of its spherical head 12 exactly in the line of the axis of rotation so that any inaccuracy in the chuck or other holding means will be eliminated in locating the axis of rotation of the cutting tool which makes the final cut in forming the hole in the work. By forming the wabbler arm with the spherical enlargement at its lower end, no mistake can be made in measuring with a micrometer or other suitable measuring instrument as all parts of the outer surface of the spherical head into engagement with which the jaws of the micrometer may be brought are equidistant from the center of the sphere. By means of this centering tool, centers may be accurately located without the necessity of turning up a test plug in the boring machine each time a center is to be located and inaccuracies in the measurements due to mistakes or defects in turning up the plug are avoided.

When a hole is to be bored in accordance with suitable punch marks made on the work, the wabbler point 13 shown in Fig. 6 may be substituted for the wabbler arm 9 in the tool and this point used in the usual manner for bringing the axis of rotation of the spindle into co-incidence with the punch mark.

Obviously, changes may be made in the construction and arrangement of the parts of the tool and I therefore do not limit myself to the particular form or arrangement shown.

Having thus fully described my invention what I claim is:—

1. A wabbler arm having a spherical head on one end, and a head on the opposite end having yieldable portions adapted to be compressed to retain said arm in an adjusted position.

2. In a center locating tool, the combination of a shank member formed with a seat at one end, a sleeve member having screw-threaded engagement with the shank member and formed with an opening in its end, a center locating arm extending through the opening in the sleeve and a globular head on the inner end of said arm formed with yielding portions to engage and grip the arm adapted to be clamped in said seat by said sleeve.

3. In a center locating tool, the combination of a shank member having a seat in one end, a sleeve having screw threaded engagement with the shank member and provided with an end formed with an opening and with a seat opposite the seat in the shank member, a center locating arm extending through the opening, a split head to grip the inner end of the arm seated within said seats, and a spherical enlargement on the outer end of the arm.

4. In a center locating tool, the combination of a shank member formed with an enlarged end provided with an external screw thread and a seat in its end, an internally screwthreaded sleeve to engage the shank member and formed with an end having an axial opening and a seat at the inner end of the opening opposite the seat on the shank member, a gripping head seated in said seats and of globular form with an axial bore and diametral slots extending inward from opposite ends of the bore at right angles to each other, an arm having a reduced end portion to engage the bore of the head, and a spherical enlargement on the outer end of the arm.

5. A center locating tool, comprising a supporting member, a wabbler arm, a head carried by the inner end thereof and having portions capable of being compressed, and means adjustably supported by said member for compressing portions of said head.

In testimony whereof I affix my signature in presence of two witnesses.

OSWALD H. WENDT.

Witnesses:
   LEWIS E. FLANDERS,
   ANNA M. DORR.